J. A. TOOHEY.
VEHICLE WHEEL.
APPLICATION FILED DEC. 6, 1909.
983,848.
Patented Feb. 7, 1911.
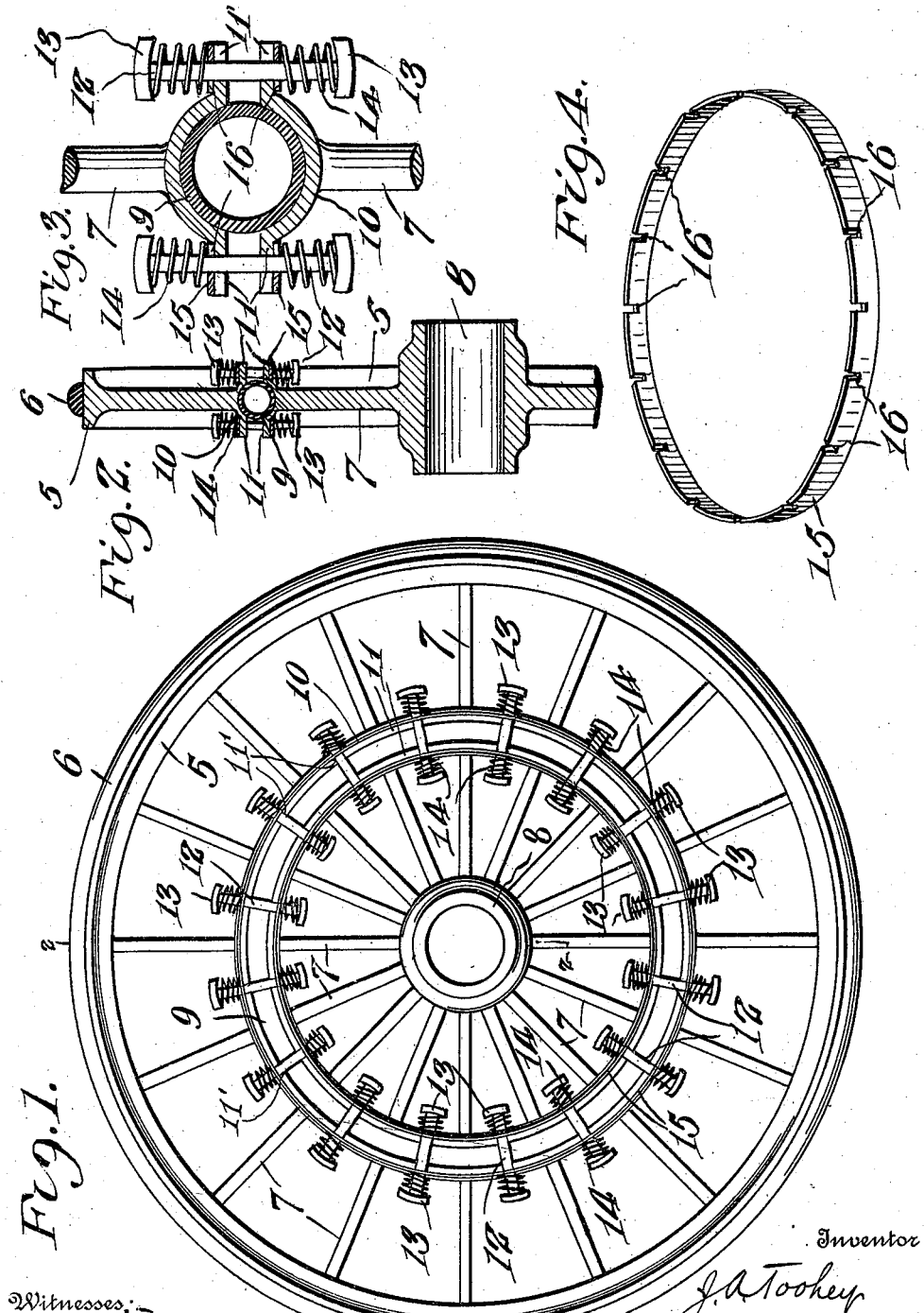

UNITED STATES PATENT OFFICE.

JOHN A. TOOHEY, OF ROCKWELL, FLORIDA, ASSIGNOR OF ONE-NINETEENTH TO DANIEL G. WATKINS, OF DUNNELLON, FLORIDA.

VEHICLE-WHEEL.

983,848.  Specification of Letters Patent.  Patented Feb. 7, 1911.

Application filed December 6, 1909. Serial No. 531,659.

*To all whom it may concern:*

Be it known that I, JOHN A. TOOHEY, a citizen of the United States, residing at Rockwell, in the county of Marion and State of Florida, have invented certain new and useful Improvements in Vehicle-Wheels, of which the following is a specification, reference being had to the accompanying drawings.

This invention relates to certain new and useful improvements in vehicle wheels and has for its object to provide a new and novel form of cushioned wheel which is adapted to relieve the body of the vehicle of the vibrations to which the same is subjected in the use of the ordinary form of wheels of this character.

Another object is to provide a wheel formed in two sections having an annular resilient member positioned between said sections, and means for securing said resilient member between the wheel sections, whereby the same may be readily removed and replaced when found necessary or desirable.

A further object resides in the provision of a wheel which is so constructed that a high degree of efficiency is attained at a minimum expenditure in its manufacture.

With these and other objects in view, the invention consists of the novel construction, combination and arrangement of parts, hereinafter fully described and claimed, and illustrated in the accompanying drawings in which, Figure 1 is a side elevation of a vehicle wheel constructed in accordance with the present invention; Fig. 2 is a section taken on the line 2—2 of Fig. 1; Fig. 3 is an enlarged detail section showing the manner of securing the resilient member between the wheel sections, and Fig. 4 is a detail perspective view of one of the retaining bands.

Referring in detail to the drawings 5 indicates the outer wheel section, and 6 the tire or tread thereof. An inner wheel section 5' is arranged in concentric relation to the outer section and is spaced therefrom. This inner section consists of a hub 8 and spokes 7 are secured therein in line with similar spokes secured in the rim of the outer wheel section. These wheel sections have arranged between them a resilient tubular member 9. The ends of the spokes 7 of each of the wheel sections have integrally formed therewith the annular flanges 11, and between the flanges a circumferential groove or channel 10 is formed which is adapted to receive the tubular member 9, the flanges extending upon opposite sides of said member. These flanges are formed with recesses 11', the recesses of the opposed flanges being alined. Rectangular keys 12 are adapted to be disposed in the recesses 11' of the flanges and are formed with enlarged heads 13. Between these heads and the flanges 11 coiled springs 14 are arranged upon the keys. These springs are adapted to assist the tubular member 9 in the assimilation of the vibrations imparted to the wheel when traveling over rough roads and will also minimize the strain thereon when an extraordinary heavy load is carried by the vehicle.

In order to retain the keys in the slots or recesses 11' of the flanges and overcome the possibility of their accidental displacement, I provide the metallic bands 15. These bands are adapted to be arranged over the outer flanges 11 of the wheel section 5 and are provided with the recesses 16 to receive the rectangular keys 12. The metallic bands are of sufficient resiliency to frictionally engage upon the flanges 11 to such extent as to overcome any tendency of their outward movement, the coiled springs 14 also materially assisting in retaining the bands in their proper position. It will be obvious that as the bands are arranged over and close the recesses 11' in the flanges, outward movement of the keys will thus be prevented. Thus should one or more of the keys 12 break, the bands 15 will still securely hold the wheel sections in proper relation upon the interposed tube 9 and obviate the liability of the collapse of the wheel. The circumscribing tread 6 may also be secured to the periphery of the outer wheel section 5 in any approved manner. When it is desired to remove the member 9 from between the wheel sections, the metallic bands 15 are first forced outwardly by means of suitable instruments and removed from the flanges. The keys 12 are then removed from the slots or recess 11' of the flanges and the inner wheel section 5' forced outwardly. The member 9 is thus displaced from the peripheral grooves 10 of the wheel sections and may be easily removed for repairs or replaced by another. In positioning the member 9 between the wheel sections, the same is first arranged in the groove 10 of the outer section and the inner wheel section 5' forced into position, the tube being compressed in this operation. The keys are then inserted into the alined slots of the flanges 11 and the metallic bands 15 replaced when the wheel is again in condition for use. In this manner the efficiency of the common tubular tread tire is materially increased and the tube protected against puncture thus eliminating considerable expense incident to the use of cushion tires as at present constructed.

From the foregoing it will be seen that I have provided a cushioned wheel which is of comparatively simple construction, is strong and durable and will absorb all shock or jar which would otherwise be imparted to the body of the vehicle when moving over rough roads. The expenditure incident to the manufacture of such wheels is also materially lessened, while the high standard of efficiency demanded in wheels of this character is maintained. By constructing the wheel in two sections, either may be replaced should the same become damaged to such an extent that it could no longer be used without incurring considerable financial expenditure which would be necessary to replace the entire wheel.

While I have shown and described what I deem to be the preferred embodiment of the invention, it will be obvious that numerous minor modifications in the form, proportion and details of construction may be resorted to whereby the device may be rendered adaptable to vehicles of various forms without materially departing from the essential features or sacrificing any of the advantages of the invention.

Having thus described the invention what is claimed is:—

1. A wheel of the character described comprising inner and outer concentrically arranged wheel sections, annular flanges formed on each of said sections disposed in opposed relation, an annular tubular member arranged centrally between the opposed flanges, said flanges having open ended slots therein, keys arranged in said slots, metallic bands arranged upon the flanges of each wheel section engaging said keys and closing the slots in the flanges, and coiled springs arranged upon the keys between their outer ends and the metallic bands.

2. A wheel of the character described comprising an inner and outer wheel section, each of said sections having annular flanges formed thereon adapted to be disposed in opposed relation, an annular resilient member arranged between said flanges, said flanges being provided with open-ended slots, rectangular keys arranged in said slots extending beyond the flanges, resilient metallic bands arranged upon the outer faces of said flanges provided with recesses to receive the keys, and coiled springs arranged upon the keys between their outer ends and the metallic bands.

3. A wheel of the character described comprising two separable wheel sections each having annular flanges formed therewith and circumscribing grooves between the flanges, said sections being disposed in concentric relation and the flanges in opposed relation, an annular tubular resilient member seated in the grooves formed between the flanges, each of said flanges being provided with a plurality of open-ended slots, keys movably disposed in the slots of said flanges, metallic annular resilient bands engaged upon said flanges provided with recesses to receive the keys, and coiled springs disposed upon said keys between their ends and said bands.

In testimony whereof I hereunto affix my signature in the presence of two witnesses.

JOHN A. TOOHEY.

Witnesses:
 WM. M. GOBER,
 J. L. MORROW.